UNITED STATES PATENT OFFICE.

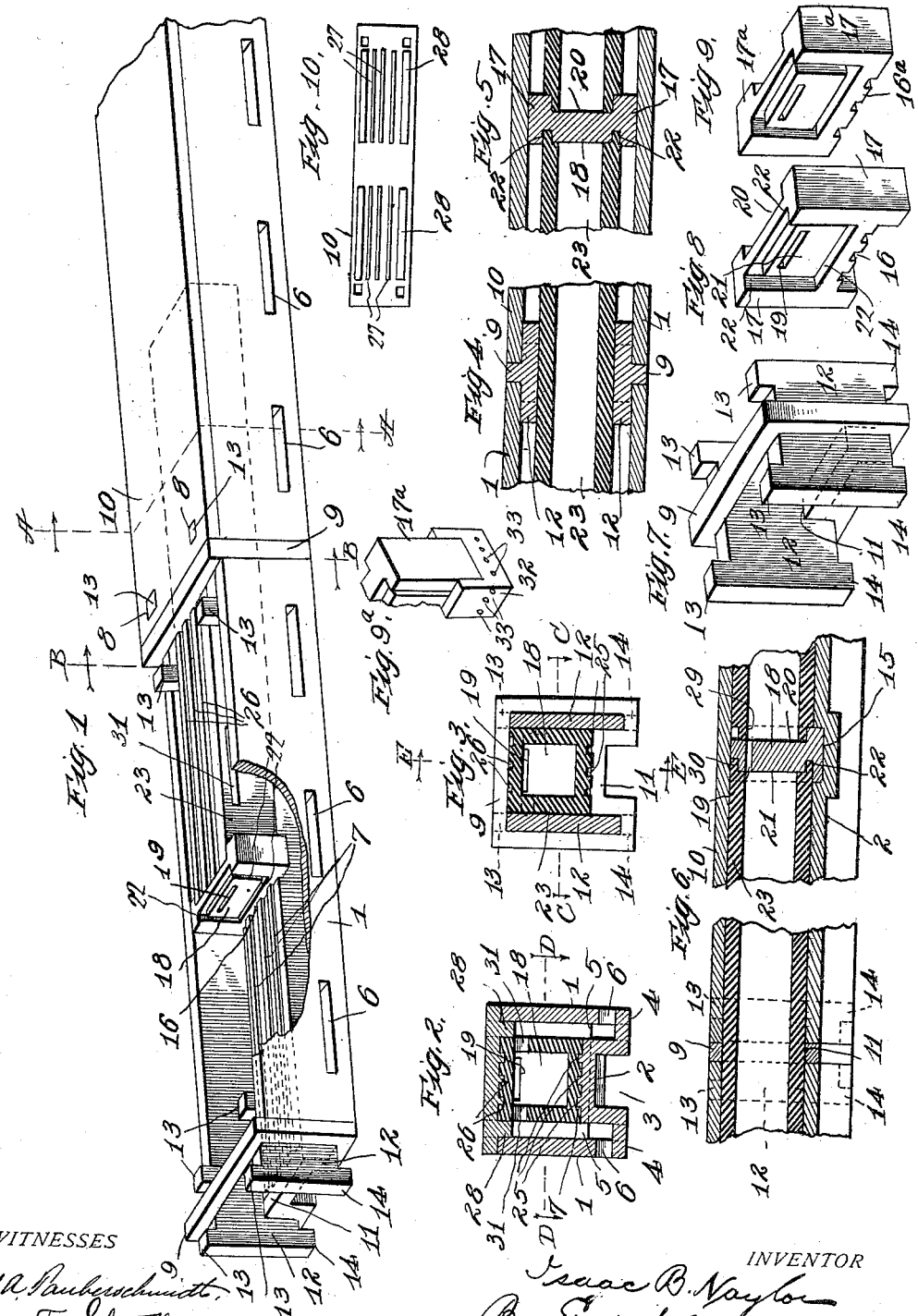

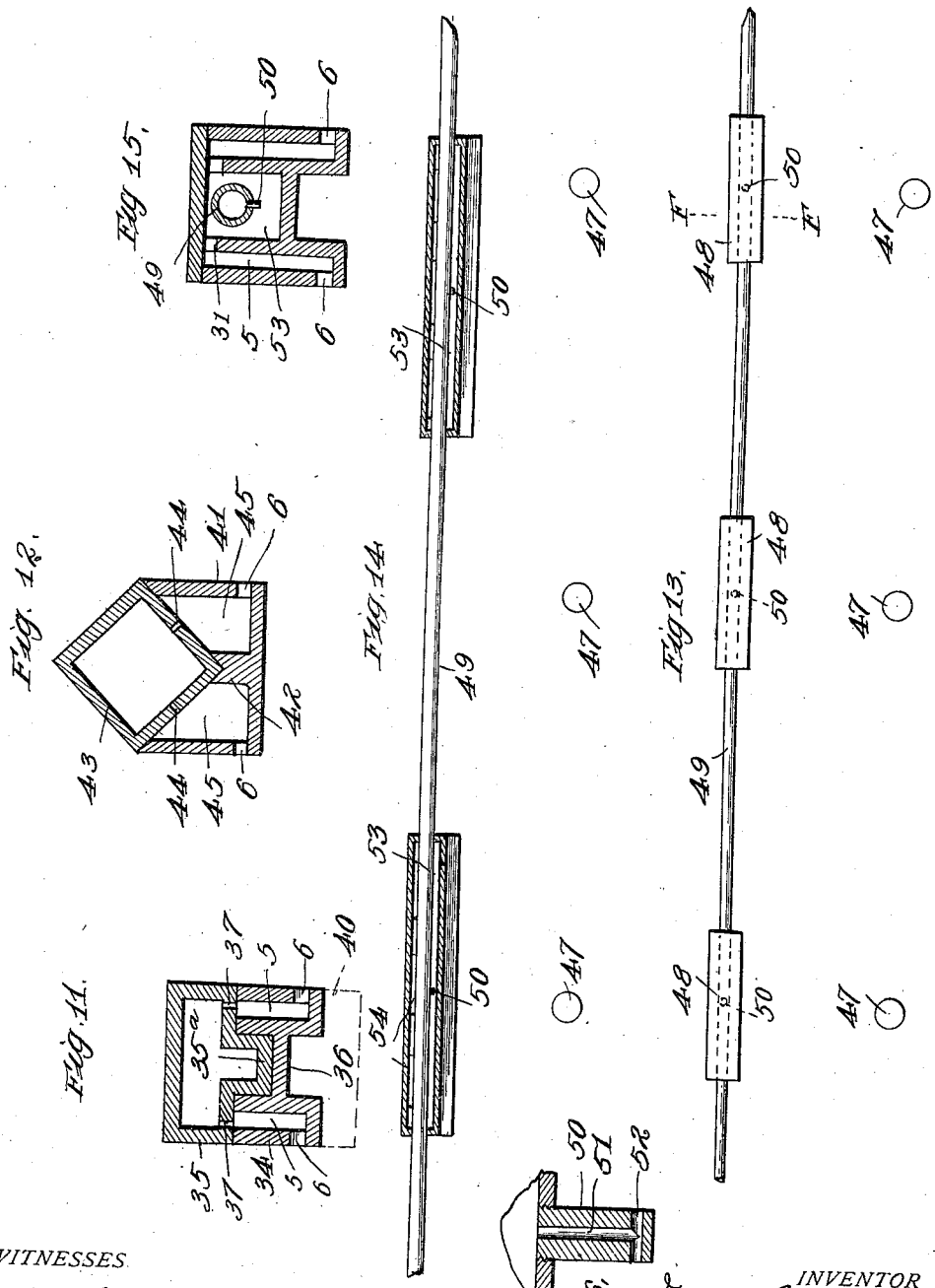

ISAAC B. NAYLOR, OF NEW YORK, N. Y.

CONDUIT FOR IRRIGATION.

1,078,637.  Specification of Letters Patent.  Patented Nov. 18, 1913.

Application filed November 23, 1912. Serial No. 733,171.

*To all whom it may concern:*

Be it known that I, ISAAC B. NAYLOR, a citizen of the United States, residing at New York, in the county of New York and State of New York, have invented certain new and useful Improvements in Conduits for Irrigation, of which the following is a specification.

The object of my present invention is to construct an irrigating conduit of independent reservoir units, each unit communicating with the next adjacent unit by means of an overflow port whereby the flow of water throughout the system may be uninterrupted and the distribution thereof steady and constant and with these and other objects in view my invention consists of the parts and combination of parts as will be hereinafter more fully pointed out.

In the drawings Figure 1 is a perspective view of a conduit embodying my invention, parts being broken away. Fig. 2 is a sectional view on the line A—A Fig. 1. Fig. 3 is a sectional view on the line B—B, Fig. 1. Fig. 4 is a sectional view on the line C—C, Fig. 3. Fig. 5 is a sectional view on the line D—D, Fig. 2. Fig. 6 is a sectional view on the line E—E, Fig. 3. Fig. 7 is a detail perspective view of one of the unions for the base sections. Fig. 8 is a detail perspective view of one of the unions and abutments for the main water pipe. Fig. 9 is a similar view of the union illustrated in Fig. 8 with the base lugs omitted. Fig. 9$^a$ is a detail view. Fig. 10 bottom plan view of the cover. Figs. 11 and 12 are transverse sectional views of other embodiments of my invention. Fig. 13 is a top plan view on a reduced scale of a series of reservoir sections connected by means of a pipe, each section being positioned near a tree. Fig. 14 is an enlarged longitudinal sectional view through two of the sections of Fig. 13, the pipe being in elevation. Fig. 15 is a transverse sectional view on the line F—F, Fig. 13. Fig. 16 is a greatly enlarged longitudinal sectional view through one of the nozzles used in the system shown in Fig. 13.

The base section comprises the side members 1 and a bottom. The bottom has a central raised portion 2 under which is formed a groove 3 extending longitudinally of the section.

4 are side base portions, constituting the bottoms of water seal channels 5, there being exits 6 for said channels through the side walls.

7 are ribs cast integrally with the raised base portion which extend longitudinally thereof as shown in the drawings.

8 are openings formed through the cover 10.

The base sections are secured together by means of a union which consists of a band 9 of a height equal to the combined height of the base section and the thickness of the cover 10 and of the same width as the base section as shown in Fig. 1. The union band has an inverted U-shaped section 11 in its base member constructed to form a continuation of the raised bottom portion 2 of the base section.

12 are locking members, or binders extending at right angles from each side of the band 9 each being provided with lugs 13 extending from their upper face and lugs 14 extending from their lower face, said locking members extending into and filling the ends of the channels 5 from top to bottom while the lugs 14 extend through the openings shown in dotted lines in Fig. 2 in the bottoms of said channels thereby locking two adjacent base sections together. The lugs 13 extend through the openings 8 in the cover 10.

About midway the length of the base section, the raised bottom portion 2 is provided with a depression or recess 15 in its upper surface in which the abutment or head shown in Figs. 8 and 9 is seated. The abutment shown in Fig. 8 comprises a base portion 16 (constructed to be seated in the recess 15,) end walls 17, constructed to fit in the channels 5, said walls extending below the base portion 16; an abutment plate 18 extends between the end walls and is provided with an overflow port 19. The abutment plate 18 is provided with a recess 20 on one side and a tongue 21 on the other side, there being a recess 22 on three sides of said tongue.

The abutment shown in Fig. 9 is like that shown in Fig. 8 with the single exception that the end walls 17$^a$ do not extend below the base 16$^a$.

The main water pipe sections 23 and 24 are provided with grooves 25 in their under faces to receive the ribs 7 of the base section thereby locking the two sections firmly against relative sidewise movement.

The upper face of each of the main water pipe sections is provided with grooves 26 constructed to receive the ribs 27 on the under face of the cover 10, said ribs being interrupted so as to leave a space equal to the width of the abutment and its end members 17.

28 are ribs depending from the underface of the cover and constructed to fit snugly in the upper portion of the channels 5 as clearly shown in Fig. 2. These ribs are also interrupted for the purpose described in connection with the ribs 27, whereby the cover may fit snugly on the top edges of the side walls 1 of the base sections.

The main water pipe sections are provided with male members 29 on one end and female members 30 on the other end so that when the sections are placed end to end the female member fits over the tongue 21 and into the recess 22 on one side of the abutment 18 while the male end of the other section fits into the recess 20 on the other side of the abutment as clearly shown in Fig. 6.

While the body of water in the channels 5 between the main pipe overflow opening 31, and the outlet 6, is ordinarily sufficient to prevent foreign matter entering the main water pipe I prefer to introduce clean coarse sand in said channels as a further precaution as it is important to keep the main water pipe free from obstruction and contamination.

In many sections of the country it is impossible to find clean coarse sand and in such event I place a filter section 32 in each of the channels 5 under the abutment shown in Fig. 9ª; the ends of the filter section being constructed to interlock with the abutment whereby it is held firmly across the opening 6. 33 are minute perforations through the filter section 32.

In Fig. 11 the base member or section 34 is constructed substantially the same as heretofore described, but the main pipe section 35 is provided with a recess 35ª in its bottom forming a tongue constructed to fit in the groove 36 of the base member thereby forming an interlock between the two members. 37 are exit ports in the water pipe 35 leading into the water seal channels 5 which are provided with exits 6. The grooves in the under face of the bottom section are adapted to receive anchors 40.

In Fig. 12 I have shown the base member 41 provided with an elevated bottom portion 42 provided with a substantially V-shaped groove in its upper face into which one corner of the square main water pipe 43 is seated, the side walls of the bottom section balancing the square pipe 43. 44 are outlets from the pipe 43 leading into the water seals 45 which have outlets 6.

In irrigating orange orchards it is a waste of water to irrigate the land except in proximity to the trees which are usually set thirty feet apart, therefore I have devised the system shown in Figs. 13 and 14 wherein 47 represent trees near each of which I arrange an irrigating reservoir section 48 of the same construction as heretofore described with the single exception that I run a main water pipe 49 through each section, said pipe extending from one section to another and connected to a suitable source of water supply.

50 is a nozzle tapped into pipe 49 on its underside and provided with a longitudinal bore 51 intercepted by a bore 52 at right angles thereto. The object of discharging the water from the nozzle toward the sides is to reduce splashing to a minimum. Water from the nozzle 50 fills the space 53 and overflows through port 31 into the water seal from whence it flows through exit 6 into the ground.

Referring to the general view in Fig. 1, water flows into the first section of the water pipe until it is filled whereupon it overflows through the port 19 into the next section and so on until each section throughout the entire system is filled, thus each section of the conduit constitutes an independent reservoir; the rate of flow of water from each reservoir being dependent upon the character of soil surrounding it.

Having thus described my invention, what I claim is:

1. An irrigating conduit comprising a base member in sections, and a water pipe in sections in said base member, said base member and pipe being spaced to form water seal channels therebetween, said pipe sections breaking joint with the base sections, respective binders between the abutting ends of the base sections of the same width and height as the base sections, each binder having an opening therethrough of a size to permit the water pipe to pass therethrough, locking members extending from each side of said binder into the respective water channels, an abutment between the adjacent ends of the respective water pipe sections closing the ends of said sections, an overflow port through said abutment near its top establishing communication between adjacent water pipe sections.

2. An irrigating conduit comprising a base member in sections, and a water pipe in sections in said base member, said base member and pipe being spaced to form water seal channels therebetween, and said pipe sections breaking joint with the base sections, respective binders between the abutting ends of the base sections of the same width and height as the base sections, each binder having an opening therethrough of a size to permit the water pipe to pass therethrough, locking members extending from each side of said binder into the respective water channels, an abutment between the adjacent ends of the respective water pipe sections closing the ends of said sections, an overflow port through said abutment near its top establishing communication between adjacent water pipe sections, and end walls on said abutment extending into said water seal channels.

3. An irrigating conduit comprising a base member in sections, and a water pipe in sections in said base member, said base member and pipe being spaced to form water seal channels therebetween, said pipe sections breaking joint with the base sections, respective binders between the abutting ends of the base sections of the same width and height as the base sections, each binder having an opening therethrough of a size to permit the water pipe to pass therethrough, locking members extending from each side of said binder into the respective water channels, an abutment between the adjacent ends of the respective water pipe sections closing the ends of said sections, an overflow port through said abutment near its top establishing communication between adjacent water pipe sections and a filler section in each channel under and interlocked with said abutment.

4. An irrigating conduit comprising a base member, ribs on the inner face of the bottom of said member, a main water pipe having ribs on its under face constructed to interlock with the ribs on the base member, ribs on the upper face of said pipe, said base member and pipe being spaced to form water seal channels therebetween, ports between said channels and said pipe and exit ports leading from the bottom of said channels, a cover, ribs depending from the under face of said cover constructed to interlock with the ribs on the upper face of the said pipe, and other ribs depending from the under face of said cover and constructed to depend in the said channels.

5. In an irrigation conduit made up of sections, a binder adapted to be interposed between successive sections and comprising a band having an inverted U shaped bottom, locking members extending at right angles from each side of said band and provided with lugs extending from their upper and lower edges.

In testimony whereof I affix my signature in presence of two witnesses.

ISAAC B. NAYLOR.

Witnesses:
EDWIN S. CLARKSON,
BENNETT S. JONES.

---

Copies of this patent may be obtained for five cents each, by addressing the "Commissioner of Patents, Washington, D. C."